United States Patent [19]
Woodall et al.

[11] Patent Number: 5,848,666
[45] Date of Patent: Dec. 15, 1998

[54] ADJUSTABLE TREE STAND

[76] Inventors: Wilbur J. Woodall; Kelly S. Woodall, both of c/o Nancy Shannon 221 Lookout Ave., Charleroi, Pa. 15022

[21] Appl. No.: 812,343

[22] Filed: Mar. 5, 1997

[51] Int. Cl.$^6$ .................................................. A45F 3/26
[52] U.S. Cl. ............................................................ 182/187
[58] Field of Search ..................................... 182/187, 188

[56] References Cited

U.S. PATENT DOCUMENTS

| | | | |
|---|---|---|---|
| 3,011,587 | 12/1961 | Mallog ................................... | 182/187 |
| 3,230,908 | 1/1966 | Grant . | |
| 3,944,279 | 3/1976 | Blockstock . | |
| 4,069,891 | 1/1978 | McClung ................................ | 182/187 |
| 4,150,733 | 4/1979 | Plummer ................................ | 182/187 |
| 4,236,602 | 12/1980 | Ceggett ................................. | 182/187 |
| 4,409,907 | 10/1983 | Norton .................................. | 182/187 |
| 4,819,763 | 4/1989 | Grote .................................... | 182/187 |
| 5,131,496 | 7/1992 | White .................................... | 182/187 |
| 5,482,137 | 1/1996 | McNeill ................................. | 182/187 |

Primary Examiner—Alvin Chin-Shue

[57] ABSTRACT

A new Adjustable Tree Stand for enabling a person to pivot in the treestand to get into a position for an accurate shot. The inventive device includes an elongated support pole, apparatus for mounting the support pole to a tree, leveling devices for leveling the support pole both horizontally and vertically, and a seat assembly pivotally attached to the support pole for pivoting movements through a predetermined arc. The seat assembly includes an apparatus for defining a plurality of intermediate seat assembly positions within the arc and a friction brake device for stabilizing the pivoting movements of the seat assembly.

11 Claims, 3 Drawing Sheets

ADJUSTABLE TREE STAND

BACKGROUND OF THE INVENTION

1. Field of the Invention

The present invention relates to tree stands and more particularly pertains to a new Adjustable Tree Stand for enabling a person to pivot in the tree stand to get into a position for an accurate shot.

2. Description of the Prior Art

The use of tree stands is known in the prior art. More specifically, tree stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art tree stands include U.S. Pat. No. 5,439,074 ; U.S. Pat. No. 4,730,699 ; U.S. Pat. No. 5,409,083 ; U.S. Pat. No. 4,129,198 ; U.S. Pat. No. 4,582,168 and U.S. Pat. No. Des. 270,474.

While these devices fulfill their respective, particular objectives and requirements, the aforementioned patents do not disclose a new Adjustable Tree Stand. The inventive device includes an elongated support pole, apparatus for mounting the support pole to a tree, leveling devices for leveling the support pole both horizontally and vertically, and a seat assembly pivotally attached to the support pole for pivoting movements through a predetermined arc. The seat assembly includes an apparatus for defining a plurality of intermediate seat assembly positions within the arc and a friction brake device for stabilizing the pivoting movements of the seat assembly.

In these respects, the Adjustable Tree Stand according to the present invention substantially departs from the conventional concepts and designs of the prior art, and in so doing provides an apparatus primarily developed for the purpose of enabling a person to pivot in the tree stand to get into a position for an accurate shot.

SUMMARY OF THE INVENTION

In view of the foregoing disadvantages inherent in the known types of tree stands now present in the prior art, the present invention provides a new Adjustable Tree Stand construction wherein the same can be utilized for enabling a person to pivot in the tree stand to get into a position for an accurate shot.

The general purpose of the present invention, which will be described subsequently in greater detail, is to provide a new Adjustable Tree Stand apparatus and method which has many of the advantages of the tree stands mentioned heretofore and many novel features that result in a new Adjustable Tree Stand which is not anticipated, rendered obvious, suggested, or even implied by any of the prior art tree stands, either alone or in any combination thereof.

To attain this, the present invention generally comprises an elongated support pole, apparatus for mounting the support pole to a tree, leveling devices for leveling the support pole both horizontally and vertically, and a seat assembly pivotally attached to the support pole for pivoting movements through a predetermined arc. The seat assembly includes an apparatus for defining a plurality of intermediate seat assembly positions within the arc and a friction brake device for stabilizing the pivoting movements of the seat assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Adjustable Tree Stand apparatus and method which has many of the advantages of the tree stands mentioned heretofore and many novel features that result in a new Adjustable Tree Stand which is not anticipated, rendered obvious, suggested, or even implied by any of the prior art tree stands, either alone or in any combination thereof.

It is another object of the present invention to provide a new Adjustable Tree Stand which may be easily and efficiently manufactured and marketed.

It is a further object of the present invention to provide a new Adjustable Tree Stand which is of a durable and reliable construction.

An even further object of the present invention is to provide a new Adjustable Tree Stand which is susceptible of a low cost of manufacture with regard to both materials and labor, and which accordingly is then susceptible of low prices of sale to the consuming public, thereby making such Adjustable Tree Stand economically available to the buying public.

Still yet another object of the present invention is to provide a new Adjustable Tree Stand which provides in the apparatuses and methods of the prior art some of the advantages thereof, while simultaneously overcoming some of the disadvantages normally associated therewith.

Still another object of the present invention is to provide a new Adjustable Tree Stand for enabling a person to pivot in the treestand to get into a position for an accurate shot.

Yet another object of the present invention is to provide a new Adjustable Tree Stand which includes an elongated support pole, apparatus for mounting the support pole to a tree, leveling devices for leveling the support pole both horizontally and vertically, and a seat assembly pivotally attached to the support pole for pivoting movements through a predetermined arc. The seat assembly includes an apparatus for defining a plurality of intermediate seat assembly positions within the arc and a friction brake device for stabilizing the pivoting movements of the seat assembly.

Still yet another object of the present invention is to provide a new Adjustable Tree Stand that quietly and smoothly enables a person to get into better position for a shot.

Even still another object of the present invention is to provide a new Adjustable Tree Stand that is compact, and easily carried and stored.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
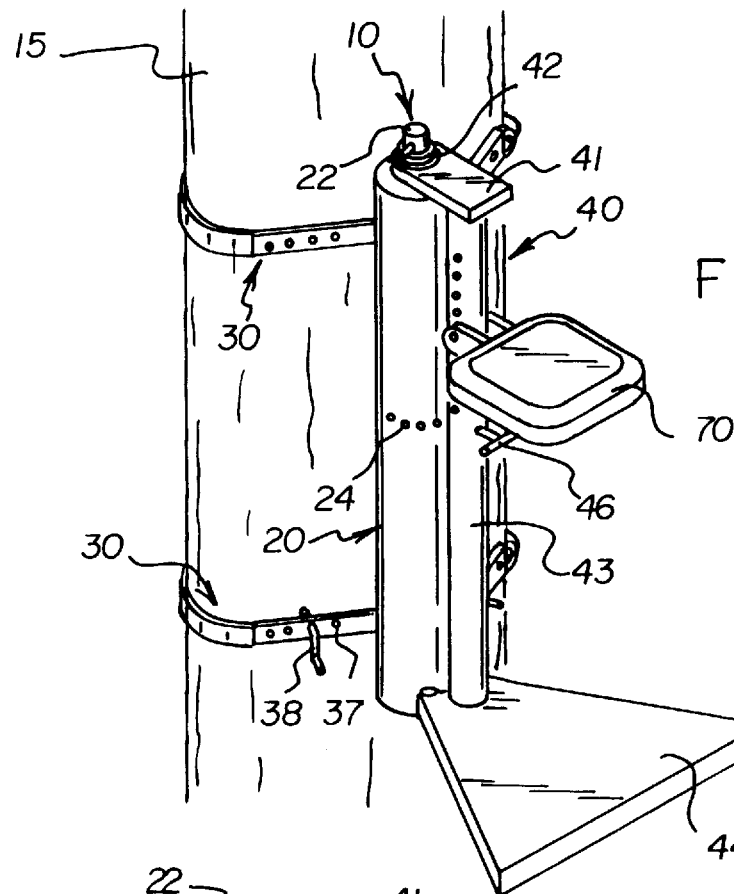
FIG. 1 is a perspective view of a new Adjustable Tree Stand mounted to a tree according to the present invention.
Figure 2:
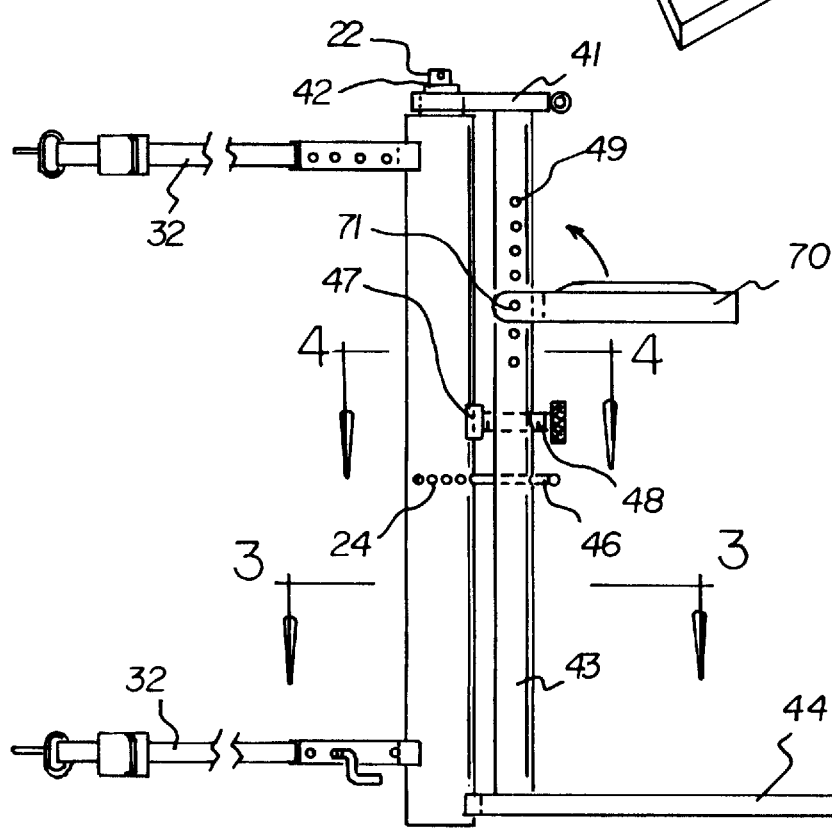
FIG. 2 is a side view thereof, with the tree removed.
Figure 3:
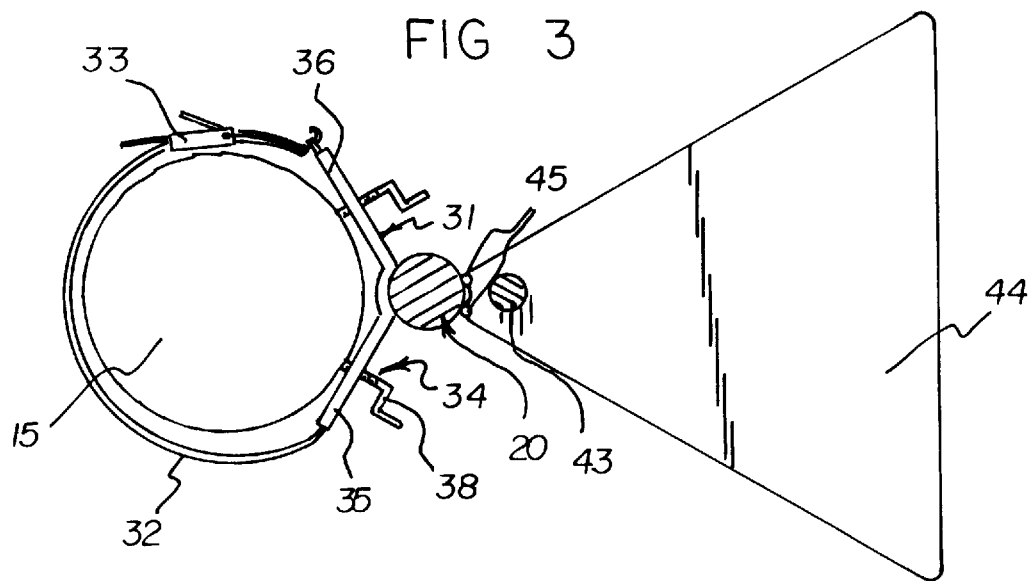
FIG. 3 is a cross sectional view taken along line 3—3 of FIG. 2.
Figure 4:
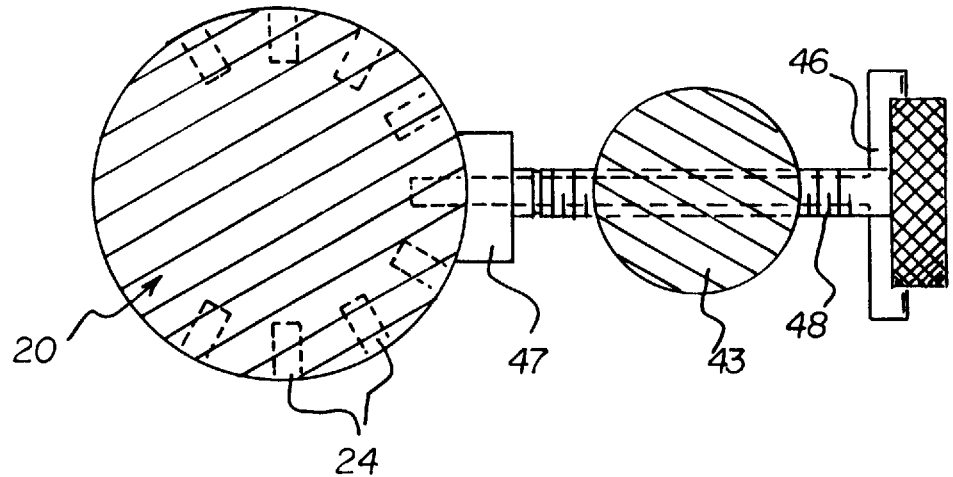
FIG. 4 is a cross sectional view taken along line 4—4 of FIG. 2.

With reference now to the drawings, and in particular to FIGS. 1 through 6 thereof, a new Adjustable Tree Stand embodying the principles and concepts of the present invention and generally designated by the reference numeral 10 will be described.

More specifically, it will be noted that the Adjustable Tree Stand 10 comprises an elongated, stationary support pole 20 secured to a tree 15 by mounting means 30, and a seat assembly 40 pivotally attached to the support pole 20.

As best illustrated in FIGS. 1 through 6, it can be shown that the support pole 20 is generally cylindrical and includes first and second opposite ends. The first end includes a short bearing support shaft 22 the purpose of which will become apparent later. A plurality of spaced holes 24 are formed in the pole between the two ends. The holes form part of an indexing means to be later described. The wholes are spaced at 45 degree intervals around the pole over a predetermined arc, preferably at least 180 degrees.

Disposed adjacent each end of the pole 20 are the mounting means 30. Each mounting means 30 includes a mounting bar 31 secured in a suitable fashion, such as by welding, to the support pole 20, and an adjustable length strap 32 having its ends connected to the ends of the mounting bar. The strap length can be adjusted by a ratchet type buckle 33, or by other suitable means. Each strap 32 is placed around the tree 15 and the straps tightened, thus securing the support pole 20 to the tree.

In order to level the support pole both vertically and horizontally, a leveling means 34 is provided. Each mounting bar 31 includes first and second arms 35,36 having threaded adjustment holes 37 along each arm. Disposed in one of the holes in each arm is an adjustment screw 38. The ends of the screws engage the tree for adjusting the position of the support pole 20. By suitably adjusting the screws in each arm, the pole 20 can be both vertically and horizontally adjusted relative to the ground to a level position. Although the bottom mounting bar is shown as having the adjustment screws, it should be realized that either of the mounting bars, or both, could have adjusting screws.

Figure 5:
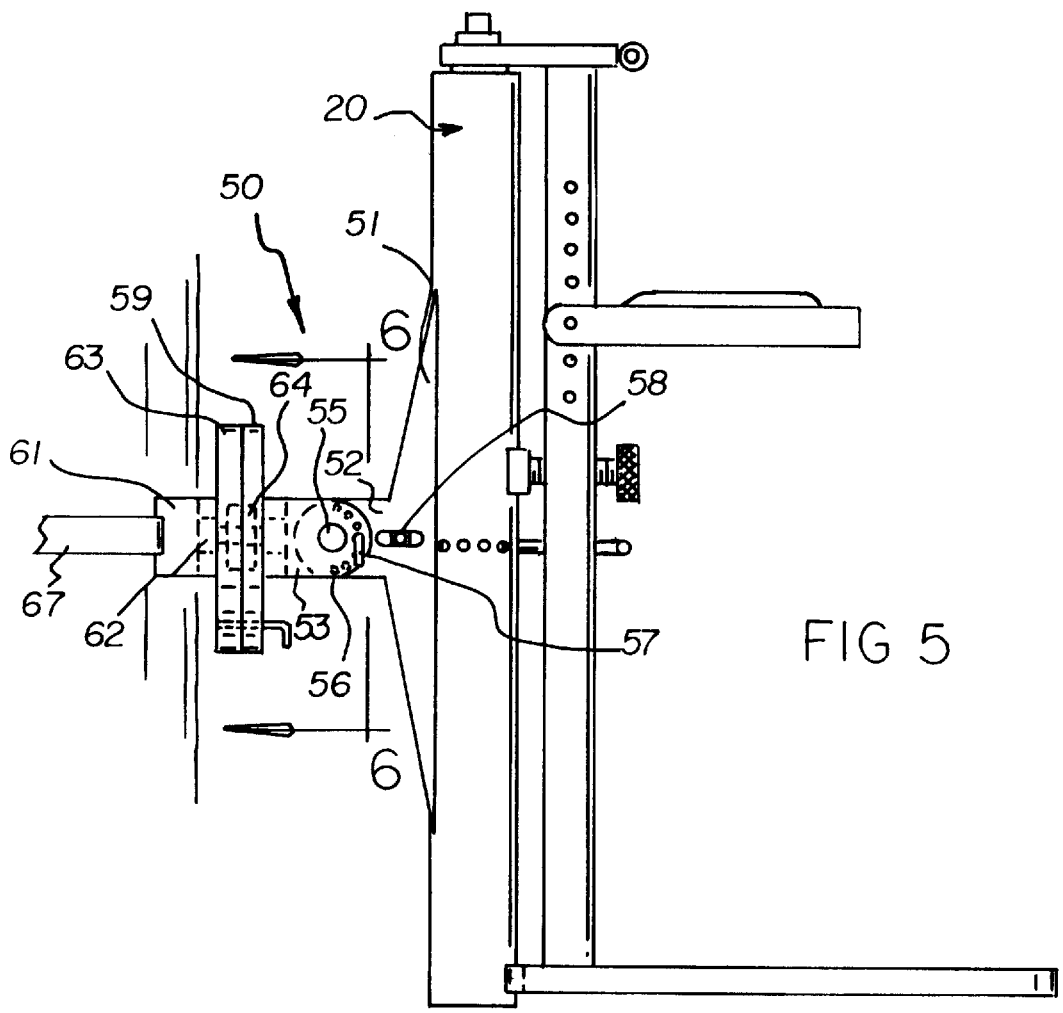
FIG. 5 is a view similar to FIG. 2, but showing an alternate embodiment of the leveling apparatus.
Figure 6:
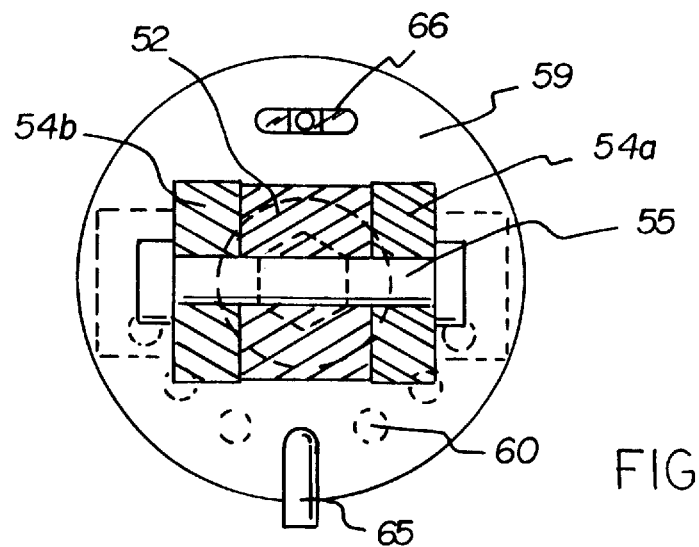
FIG. 6 is a cross sectional view taken along line 6—6 of FIG. 5.

An alternate embodiment of a leveling means 50 is shown in FIGS. 5 and 6. The support pole 20 is substantially as previously described, and is attached to the tree using mounting means 30 as in FIGS. 1–4. However, disposed between the ends of the pole 20 is a bracket 51. The bracket 51 is secured to the pole in a suitable fashion, such as by welding, and includes a projecting arm 52. The arm 52 includes a plurality of leveling through holes (not shown). A middle pivot member 53 is attached to the bracket 51. The member 53 includes right and left ears 54a,54b on either side of the arm 52 and attached to the arm by a pivot pin 55. Each ear 54a,54b includes leveling through holes 56 corresponding with the holes in the arm 52. A leveling pin 57 is disposed through the holes in the holes 56 in the ears 54a,54b and arm 52. By removing the pin 57 and pivoting the bracket 51 about the pivot shaft 55, the vertical level of the pole 20 can be adjusted. Once the pole is vertically level the pin 57 is inserted into the matching holes to lock the vertical position. Indication means 58 can be formed in the bracket 51 to indicate whether the pole is level or not. The indication means can be a level ball within a slot, or a level bubble within a liquid. Both are well known types of indicators, and the specifics of such devices would be obvious to one having ordinary skill in the art.

The middle pivot member 53 includes a pivot disc 59 opposite the ears 54a,54b having a plurality of through holes 60. The disc 59 is pivotally attached to a pivot member 61 by a pivot pin 62 (shown in dashed lines). The pivot member 61 includes a pivot disc 63 which is similar to the disc 59, including a plurality of through holes (not shown) corresponding to the holes 60. A bearing 64 is disposed between the discs 59,63 in order to facilitate pivoting of the discs 59,63 relative to each other. A leveling pin 65 is disposed in the through holes of the discs 59,63 to lock the discs together. By removing the pin 65, the discs can pivot relative to each other to horizontally level the support pole 20. Inserting the pin locks the horizontal position. Indicating means 66 in the form of a level ball in a slot or a level bubble in liquid can be formed in the disc 59 to provide an indication of the horizontal levelness of the pole 20.

The end of the pivot member 61 opposite the disc 63 preferably rests against the tree, and could include a strap 67 attached thereto and fitting around the tree for securing the pivot member in place against the tree.

The seat assembly 40 is pivotally attached to the pole 20. The assembly includes a pivot plate 41 having one end pivotally attached to the shaft 22 through a bearing 42, such that the plate pivots relative to the shaft 22. The other end of the plate 41 is attached to a seat support pole 43. The pole 43 extends parallel to the pole 20 and is attached at its opposite end to platform 44. The platform 44 has an arcuate inner edge with bearings 45 attached thereto which engage with the outer surface of the pole 20, facilitating pivoting of the seat assembly.

The seat assembly includes an indexing means in the form of a spring biased indexing pin 46 extending through the seat support pole 43 and engaging with one of the holes 24. By pulling on the pin 46, it is removed from its hole 24, permitting the assembly to pivot about the pole 20. By releasing the pin, it will be biased back into one of the holes 24 to lock the assembly into one of a plurality of positions over the range of motion. In order to prevent free pivoting and stabilize the pivoting movements, a friction brake means including a friction pad 47 engaging the pole 20 and a threaded adjustment member 48 attached to the pad 47 and extending through the pole 43 are used. The pad 47 frictionally engages the pole 20 to control the rate and ease of movement, and the friction force is adjusted by turning the member 48.

The pole 43 also includes a plurality of vertically spaced through holes 49 for pivotally attaching a seat 70 to the pole with a pin 71. The seat can thus pivot relative to the pole 43 to facilitate transportation and storage, and can be vertically adjusted to different heights.

In use, the mounting means are attached to the tree, and the pole is leveled. The seat assembly is thus in a safe, level position for a user to sit on. The user sits on the seat and pulls out the pin 46 to permit the seat assembly to pivot relative to the pole 20. The bearings 45 facilitate the pivoting movements and the friction pad 47 smoothes the movements. When the desired position is reached, the user releases the pin 46, which is biased back into one of the holes 24 in the pole 20, thus locking the assembly at that position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable tree stand comprising:
   an elongated support pole;
   mounting means for mounting the support pole to a tree;
   means for leveling the support pole relative to the ground;
   a seat assembly pivotally attached to the support pole for pivoting movement through a predetermined arc;
   said seat assembly indexing means associated therewith defining a plurality of intermediate seat assembly positions within the predetermined arc; and
   a friction brake means to stabilize pivoting movements of the seat assembly.

2. The adjustable tree stand of claim 1, wherein the friction brake means comprises an adjustable friction pad attached to the seat assembly and engaging the support pole.

3. The adjustable tree stand of claim 1, wherein the predetermined arc is at least 180 degrees.

4. The adjustable tree stand of claim 1, wherein the indexing means comprises a spring biased lock pin attached to the seat assembly and a plurality of spaced indexing holes within the support pole sized to receive the lock pin.

5. The adjustable tree stand of claim 4, wherein the holes are spaced at intervals of approximately 45 degrees around the support pole.

6. The adjustable tree stand of claim 1, wherein the seat assembly includes a seat support pole, a seat attached to the seat support pole, and a platform attached to a base of the seat support pole, further comprising a plurality of bearings attached to the platform and engaged with the elongated support pole in order to facilitate pivoting movements of the seat assembly.

7. The adjustable tree stand of claim 6, wherein the seat is pivotally attached to the seat support pole and is adjustable along the seat support pole.

8. The adjustable tree stand of claim 1, wherein the leveling means levels the support pole both vertically and horizontally relative to the ground.

9. The adjustable tree stand of claim 1, further comprising indicating means associated with the leveling means for indicating the levelness of the support pole.

10. An adjustable tree stand comprising:
    an elongated support pole;
    mounting means for mounting the support pole to a tree;
    means for leveling the support pole relative to the ground;
    a seat assembly pivotally attached to the support pole for pivoting movement through a predetermined arc;
    said seat assembly including indexing means associated therewith defining a plurality of intermediate seat assembly positions within the predetermined arc;
    an indicating means associated with the leveling means for indicating the levelness of the support pole;
    wherein the seat assembly includes a seat support pole, a seat attached to the seat support pole, and a platform attached to a base of the seat support pole, further comprising a plurality of bearings attached to the platform and engaged with the elongated support pole in order to facilitate pivoting movements of the seat assembly; and
    wherein the seat is pivotally attached to the seat support pole and is adjustable along the seat support pole.

11. An adjustable tree stand comprising:
    an elongated support pole;
    mounting means for mounting the support pole to a tree;
    means for horizontally and vertically leveling the support pole relative to the ground, and indicating means associated with the leveling means for indicating the levelness of the support pole;
    a seat assembly pivotally attached to the support pole for pivoting movement through an arc of at least 180 degrees, the seat assembly including a seat support pole, and a platform attached to a base of the seat support pole, further comprising a plurality of bearings attached to the platform and engaged with the elongated support pole in order to facilitate pivoting movements of the seat assembly;

said seat assembly further including indexing means associated therewith defining a plurality of intermediate seat assembly positions within the arc of movement, the indexing means comprising a spring biased lock pin attached to the seat support pole and a plurality of indexing holes spaced at 45 degree intervals within the elongated support pole sized to receive the lock pin; and said seat assembly further including an adjustable friction pad attached to the seat support pole and engaged with elongated support pole, to stabilize pivoting movements of the seat assembly.

* * * * *